United States Patent
Yang et al.

(10) Patent No.: US 10,739,648 B2
(45) Date of Patent: Aug. 11, 2020

(54) DISPLAY DEVICE

(71) Applicant: InnoLux Corporation, Miao-Li County (TW)

(72) Inventors: Shun-Chen Yang, Miao-Li County (TW); Ying-Tong Lin, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 127 days.

(21) Appl. No.: 15/878,639

(22) Filed: Jan. 24, 2018

(65) Prior Publication Data

US 2018/0149929 A1    May 31, 2018

Related U.S. Application Data

(63) Continuation of application No. 14/817,289, filed on Aug. 4, 2015, now Pat. No. 9,910,321.

(30) Foreign Application Priority Data

Apr. 2, 2015  (TW) .............................. 104110840 A

(51) Int. Cl.
*G02F 1/1343* (2006.01)
*G02F 1/1362* (2006.01)

(52) U.S. Cl.
CPC .. *G02F 1/134309* (2013.01); *G02F 1/136227* (2013.01); *G02F 2201/123* (2013.01); *G02F 2201/124* (2013.01); *G02F 2201/40* (2013.01); *G02F 2201/42* (2013.01)

(58) Field of Classification Search
CPC ......... G02F 1/134309; G02F 1/136227; G02F 2201/123; G02F 2201/124; G02F 2201/40; G02F 2201/42
See application file for complete search history.

(56) References Cited

U.S. PATENT DOCUMENTS

| | | | |
|---|---|---|---|
| 10,222,658 B2 * | 3/2019 | Zhang | G02F 1/134309 |
| 2014/0152934 A1 * | 6/2014 | Huh | G02F 1/133707 349/43 |
| 2016/0291420 A1 | 10/2016 | Yang et al. | |

FOREIGN PATENT DOCUMENTS

| | | |
|---|---|---|
| CN | 103733130 A | 4/2014 |
| CN | 103852942 A | 6/2014 |

* cited by examiner

*Primary Examiner* — Angela K Davison
(74) *Attorney, Agent, or Firm* — Bacon & Thomas, PLLC

(57) ABSTRACT

A display device is disclosed, which includes: a first substrate including; a switch unit; and a pixel electrode electrically connecting to the switch unit and comprising: a first finger portion with a first inner edge; a second finger portion with a second inner edge and a first outer edge; a contacting portion electrically connecting to the switch unit; a first bending portion connecting the first finger portion and the contacting portion and having a third inner edge; and a second bending portion connecting the second finger portion and the contacting portion and having a fourth inner edge and a second outer edge. The first finger portion has a first width along a first direction, the first bending portion has a second width along the first direction, the first direction is substantially parallel to a gate-line-extending direction, and the first width is greater than the second width.

7 Claims, 8 Drawing Sheets

DISPLAY DEVICE

CROSS REFERENCE TO RELATED APPLICATION

This application claims the benefits of the Taiwan Patent Application Serial Number 1041110840, filed on Apr. 2, 2015, the subject matter of which is incorporated herein by reference.

This application is a continuation (CA) of U.S. Patent application for "DISPLAY DEVICE", U.S. application Ser. No. 14/817,289 filed Aug. 4, 2015, and the subject matter of which is incorporated herein by reference.

BACKGROUND

1. Field of the Invention

The embodiments relate to a display panel and, more particularly, to a display panel that the pixel electrode near to the contact via has a specific pattern to improve the liquid-crystal efficiency.

2. Description of Related Art

In recent years, all the display devices are developed toward having small volume, thin thickness and light weight as the display techniques progresses. A liquid crystal display (LCD) device is a flat panel display device with a thin thickness, so a conventional cathode ray tube (CRT) display is gradually replaced by the LCD device. Especially, the LCD device can be applied to various fields. For example, the daily used devices such as cell phones, notebooks, video cameras, cameras, music players, navigation devices, and televisions are equipped with liquid crystal display (LCD) panels.

For the conventional LCD device, a liquid crystal layer is disposed on a pixel electrode, and voltage is applied onto the pixel electrode to control the tilt of liquid crystal molecules. Thus, it is possible to control light from a backlight module disposed below the LCD panel to pass or not pass through the liquid crystal layer, and the purpose of displaying can be achieved. In addition, the purpose of displaying different colors can be achieved through the pixel units.

Even though the techniques of the LCD device are getting matured, many manufacturers are desired to develop LCD panels having improved display quality thereof to meet the consumers' requirements. Hence, it is desirable to provide a display panel with improved display quality to satisfy the requirement for high display quality.

SUMMARY

The object of the embodiments is to provide a display device, wherein a pattern of a pixel electrode near to a contact via is designed to thereby reduce the widths of dark lines corresponding thereto; therefore, the liquid-crystal efficiency in this region can be increased to improve the overall display quality of the display device.

Hence, one aspect of the embodiments is to provide a display device, comprising: a first substrate; a second substrate; and a display medium between the first substrate and the second substrate. Herein, the first substrate comprises: a switch unit; and a pixel electrode electrically connecting to the switch unit and comprising: a first finger portion with a first inner edge; a second finger portion with a second inner edge and a first outer edge, wherein the second inner edge is between the first inner edge and the first outer edge; a contacting portion electrically connecting to the switch unit through a contact via; a first bending portion between the first finger portion and the contacting portion, connecting the first finger portion and the contacting portion, and having a third inner edge; and a second bending portion between the second finger portion and the contacting portion, connecting the second finger portion and the contacting portion, and having a fourth inner edge and a second outer edge, wherein the fourth inner edge is between the third inner edge and the second outer edge, wherein a first angle included between a first extension line of the first inner edge and the third inner edge is smaller than a second angle included between a second extension line of the first outer edge and the second outer edge.

In the display device of the embodiments, the first substrate further comprises: an insulating layer disposed over the switch unit and having the contact via to expose a part of the switch unit, and a part of the contacting portion disposed in the contact via to electrically connect to the switch unit.

In the display device of the present aspect, the second finger portion has a first width along a first direction, the second bending portion has a second width along the first direction, the first direction is substantially parallel to a gate-line-extending direction, and the first width is greater than the second width.

In the display device of the embodiments, a bending portion gap is between the third inner edge and the fourth inner edge, the second bending portion has a first length along a second direction, the bending portion gap has a second length along the second direction, the second direction is substantially vertical to a gate-line-extending direction, and the first length is substantially equal to the second length.

In the display device or the embodiments, a finger portion gap is between the first inner edge and the second inner edge, a bending portion gap is between the third inner edge and the fourth inner edge, the finger portion gap has a third width along a first direction, the bending portion gap has a fourth width along the first direction, the first direction is substantially parallel to a gate-line-extending direction, and the third width is smaller than the fourth width.

In the display device of the embodiments, a difference between the first angle and the second angle is in a range from 1 degree to 10 degree.

In the display device of the embodiments, the first finger portion has a third outer edge opposite to the first inner edge, there is a first distance from the first outer edge to the third outer edge along a first direction, the contacting portion has a fifth width along the first direction, the first direction is substantially parallel to a gate-line-extending direction, and the first distance is smaller than the fifth width.

In the display device of the embodiments, the first bending portion has a fourth outer edge opposite to the third inner edge, there is a second distance from the second outer edge to the fourth outer edge along a first direction, the contacting portion has a fifth width along the first direction, the first direction is substantially parallel to a gate-line-extending direction, and the second distance is smaller than the fifth width.

In the display device of the embodiments, the first finger portion has a third outer edge opposite to the first inner edge, the first bending portion has a fourth outer edge opposite to the third inner edge, there is a first distance from the first outer edge to the third outer edge along a first direction, there is a second distance from the second outer edge to the fourth outer edge along the first direction, the first direction is substantially parallel to a gate-line-extending direction, and the first distance is greater than the second distance.

Another aspect of the embodiments is to provide a display device, comprising: a first substrate; a second substrate; and a display medium between the first substrate and the second substrate. Herein, the first substrate comprises: a switch unit; and a pixel electrode electrically connecting to the switch unit and comprising: a first finger portion; a second finger portion; a contacting portion electrically connecting to the switch unit through a contact via; a first bending portion between the first finger portion and the contacting portion, connecting the first finger portion and the contacting portion, and having a third inner edge; and a second bending portion between the second finger portion and the contacting portion, connecting the second finger portion and the contacting portion, and having a fourth inner edge and a second outer edge, wherein the fourth inner edge is between the third inner edge and the second outer edge, wherein a first acute angle included between the third inner edge and a reference line parallel to a first direction is greater than a second acute angle included between the second outer edge and the reference line, and the first direction is substantially parallel to a gate-line-extending direction.

In the display device of the embodiments, the first substrate further comprises: an insulating layer disposed over the switch unit and having the contact via to expose a part of the switch unit, and a part of the contacting portion disposed in the contact via to electrically connect to the switch unit.

In the display device of the embodiments, the second finger portion has a first width along the first direction, the second bending portion has a second width along the first direction, and the first width is greater than the second width.

In the display device of the embodiments, a bending portion gap is between the third inner edge and the fourth inner edge, the second bending portion has a first length along a second direction, the bending portion gap has a second length along the second direction, the second direction is substantially vertical to a gate-line-extending direction, and the first length is substantially equal to the second length.

In the display device of the embodiments, the first finger portion has a first inner edge, the second finger portion has a second inner edge near to the first finger portion, a finger portion gap is between the first inner edge and the second inner edge, a bending portion gap is between the third inner edge and the fourth inner edge, the finger portion gap has a third width along the first direction, the bending portion gap has a fourth width along the first direction, and the third width is smaller than the fourth width.

In the display device of the embodiments, a difference between the first acute angle and the second acute angle is in a range from 1 degree to 10 degree.

In the display device of the embodiments, the first finger portion has a first inner edge and a third outer edge opposite to the first inner edge, the second finger portion has a second inner edge and a first outer edge opposite to the second inner edge, the first inner edge is adjacent to the second inner edge, there is a first distance from the first outer edge to the third outer edge along the first direction, the contacting portion has a fifth width along the first direction, and the first distance is smaller than the fifth width.

In the display device of the embodiments, the first bending portion has a fourth outer edge opposite to the third inner edge, there is a second distance from the second outer edge to the fourth outer edge along the first direction, the contacting portion has a fifth width along the first direction, and the second distance is smaller than the fifth width.

In the display device of the embodiments, the first finger portion has a first inner edge and a third outer edge opposite to the first inner edge, the second finger portion has a second inner edge and a first outer edge opposite to the second inner edge, the first inner edge is adjacent to the second inner edge, the first bending portion has a fourth outer edge opposite to the third inner edge, there is a first distance from the first outer edge to the third outer edge along the first direction, there is a second distance from the second outer edge to the fourth outer edge along the first direction, and the first distance is greater than the second distance.

In the display device of the embodiments, a first angle included between a first extension line of the first inner edge of the first finger portion and the third inner edge of the first bending portion is designed to be smaller than a second angle included between a second extension line of the first outer edge of the second finger portion and the second outer edge of the second bending portion, and/or a first acute angle included between the third inner edge of the first bending portion and a reference line parallel to a first direction (which is substantially parallel to a gate-line-extending direction) is designed to be greater than a second acute angle included between the second outer edge of the second bending portion and the reference line, thereby achieving the purpose of adjusting the pattern of the pixel electrode near to the contact via. Meanwhile, the first width of the second finger portion along the gate-line-extending direction is designed to be greater than the second width of the second bending portion along the same direction, and/or the gap between the first bending portion and the second bending portion is designed to be larger than that between the first finger portion and the second finger portion, thereby achieving the purpose of reducing the widths of the pattern of the pixel electrode near to the contact via. Hence, in the display device of the present invention, the liquid-crystal efficiency in this region can be increased due to the design of the pattern of the pixel electrode near to the contact via; and therefore the overall display quality of the display device can further be improved.

Other objects, advantages, and novel features of the embodiments will become more apparent from the following detailed description when taken in conjunction with the accompanying drawings.

DETAILED DESCRIPTION

The embodiments have been described in an illustrative manner, and it is to be understood that the terminology used is intended to be in the nature of description rather than of limitation. Many modifications and variations are possible in light of the above teachings. Therefore, it is to be understood that within the scope of the appended claims, the invention may be practiced otherwise than as specifically described.

Furthermore, the ordinal numbers such as "first", "second" and "third" used in the present specification and the appended claims are used to modify the units in the appended claims. The ordinal numbers themselves do not mean or represent the claimed units having ordinal numbers, and do not represent the order of one claimed unit to another claimed unit or the sequence of the manufacturing process. The ordinal numbers are used only for naming one claimed unit to clearly distinguish the claimed unit from the other claimed unit having the same term.

Figure 1:
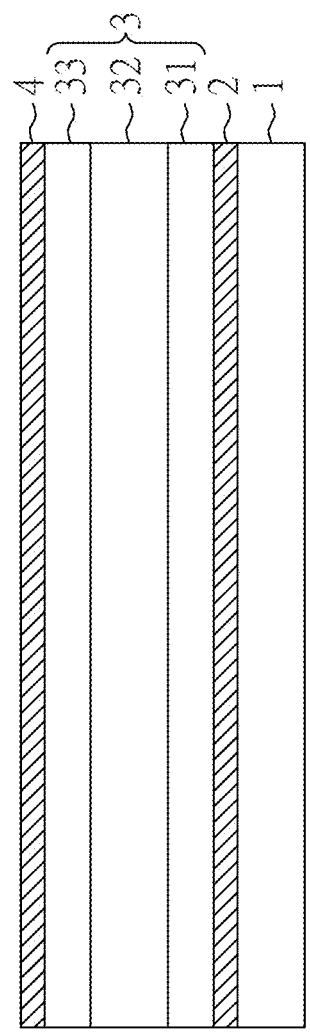
FIG. 1 is a cross-sectional view of a display device according to one embodiment.

FIG. 1 is a cross-sectional view of a display device according to one embodiment. The display device of the present embodiment comprises a backlight module 1 with a first polarizer 2, a display panel 3, and a second polarizer 4 sequentially disposed thereon. Herein, the display panel 3 of the present embodiment comprises: a first substrate 31, a second substrate 33, and a display medium 32 between the first substrate 31 and the second substrate 33. In the present embodiment, the first substrate 31 can be a thin film transistor (TFT) substrate comprising TFT units (not shown in the figure) as switch units; and the second substrate 33 can be a color filter (CF) substrate comprising a CF layer (not shown in the figure). However, in other embodiment, the CF layer (not shown in the figure) may be comprised in the first substrate 31; in this case, the first substrate 31 is a color filter on array (COA) substrate. In addition, in the present embodiment, the display medium 32 is a liquid crystal layer known in the art.

Figure 2:
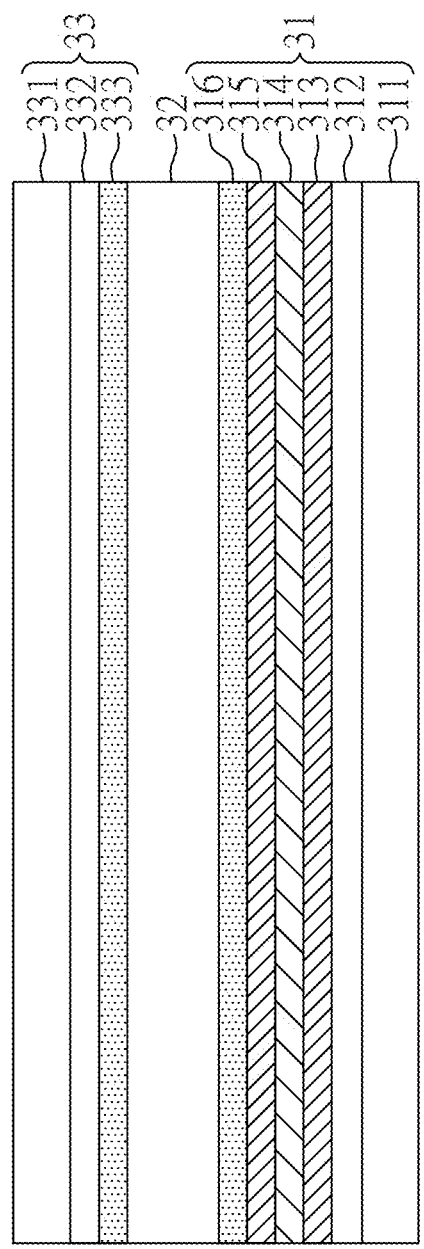
FIG. 2 is a cross-sectional view of a display device according to one embodiment.

FIG. 2 is a cross-sectional view of a display device according to one embodiment. Herein, the first substrate 31 of the present embodiment comprises a substrate 311 with a TFT layer 312, a common electrode layer 313, a first insulating layer 314, a pixel electrode layer 315 and a first alignment layer 316 sequentially disposed thereon. Herein, the TFT layer 312 comprises plural TFT units (not shown in the figure) as switch units, and the pixel electrode layer 315 comprises plural pixel electrode (not shown in the figure). In addition, the second substrate 33 comprises another substrate 331 with a CF layer 332 and a second alignment layer 333 disposed thereon. Furthermore, the display medium 32 is disposed between the first alignment layer 316 and the second alignment layer 333 in the present embodiment. Herein, the substrates 311, 331 can be made of any material for substrates generally used in the art, such as glass, plastic or other flexible materials; the common electrode layer 313 and the pixel electrode layer 315 can be made of any material for transparent conductive electrodes such as ITO, IZO or ITZO; the first insulating layer 314 can be made of any insulating material generally used in the art such as oxides, nitrides or nitrogen oxides; and the first alignment layer 316 and the second alignment layer 333 can be made of any alignment layer material generally used in the art such as polyimide (PI), followed by performing an alignment layer process (such as rubbing process or photo-alignment process) thereon.

Hereinafter, the structures of the pixel electrodes on the first substrate 31 shown in FIGS. 1 and 2 are illustrated in detail.

Figure 3:
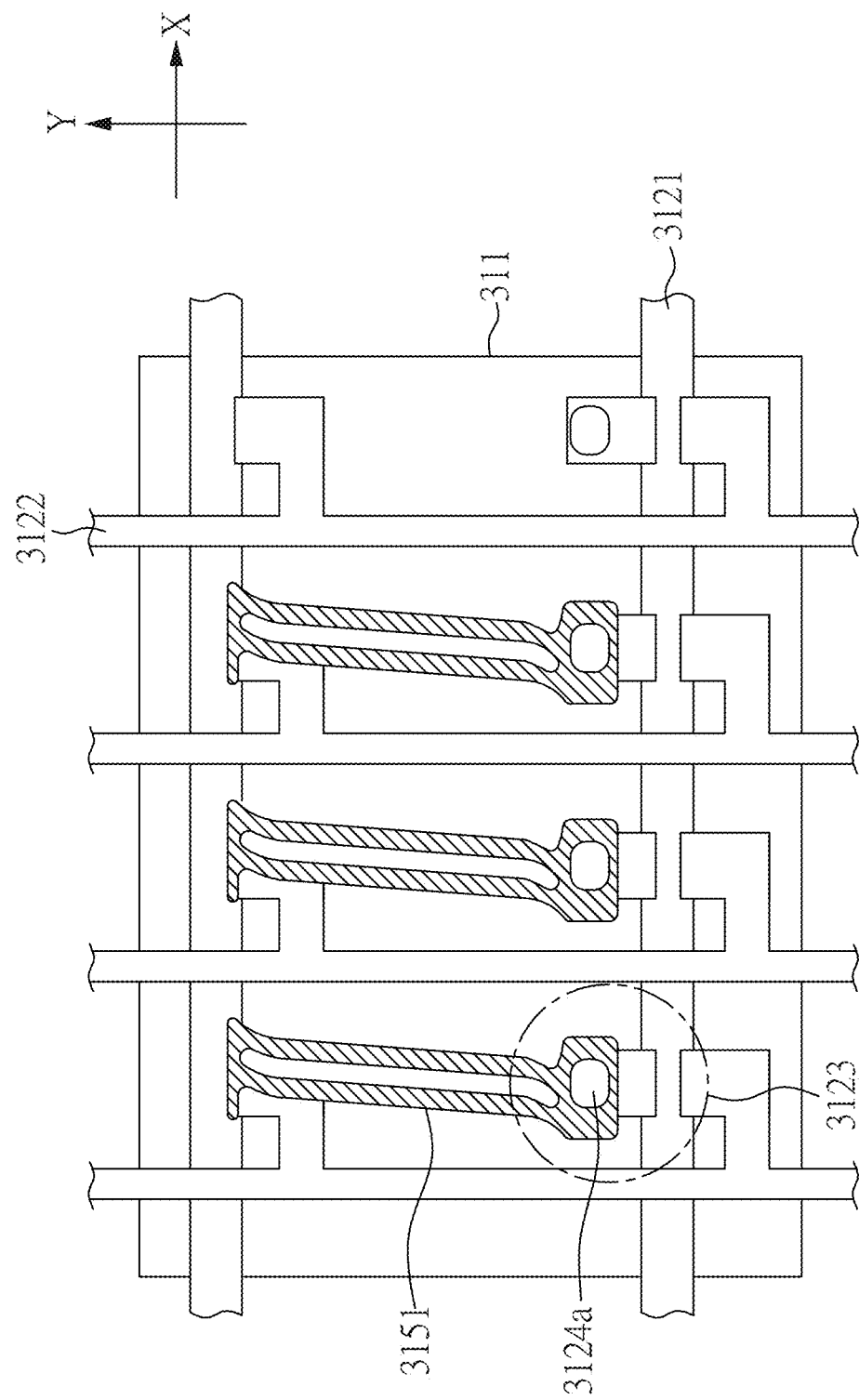
FIG. 3 is a top view of a first substrate according to one embodiment.
Figure 4:
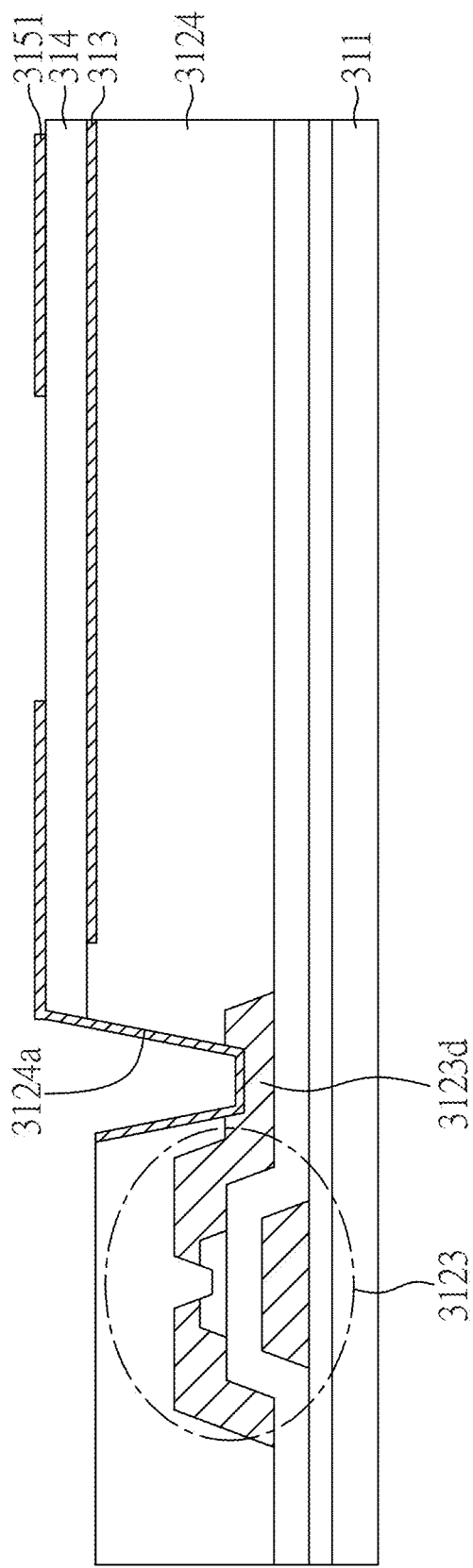
FIG. 4 is a cross-sectional view of a first substrate according to one embodiment.

FIGS. 3 and 4 are respectively a top view and a cross-sectional view of a first substrate according to one embodiment. As shown in FIGS. 3 and 4, the first substrate of the present embodiment comprises: plural gate lines 3121 substantially parallel to each other; plural data lines 3122 substantially parallel to each other and crossing the gate lines 3121; plural switch units 3123 respectively electrically connecting to the gate lines 3121 and the data lines 3122; and plural pixel electrodes 3151 respectively disposed in a region defined by the gate lines 3121 and the data lines 3122 and electrically connecting to the switch units 3123. In addition, the first substrate further comprises: a second insulating layer 3124, disposed over the switch units 3123 of the TFT layer 312 and having contact vias 3124a to expose a part of the switch units 3123, i.e. drain electrodes 3123d of the switch units 3123.

Herein, the pixel electrode of the present embodiment has specific shapes to improve the liquid-crystal efficiency as well as reduce the widths of the dark lines when the display panel is in a bright state. Hereinafter, the shape of the pixel electrode near to the contact via in the display panel of the present embodiment is illustrated in detail.

Figure 5:
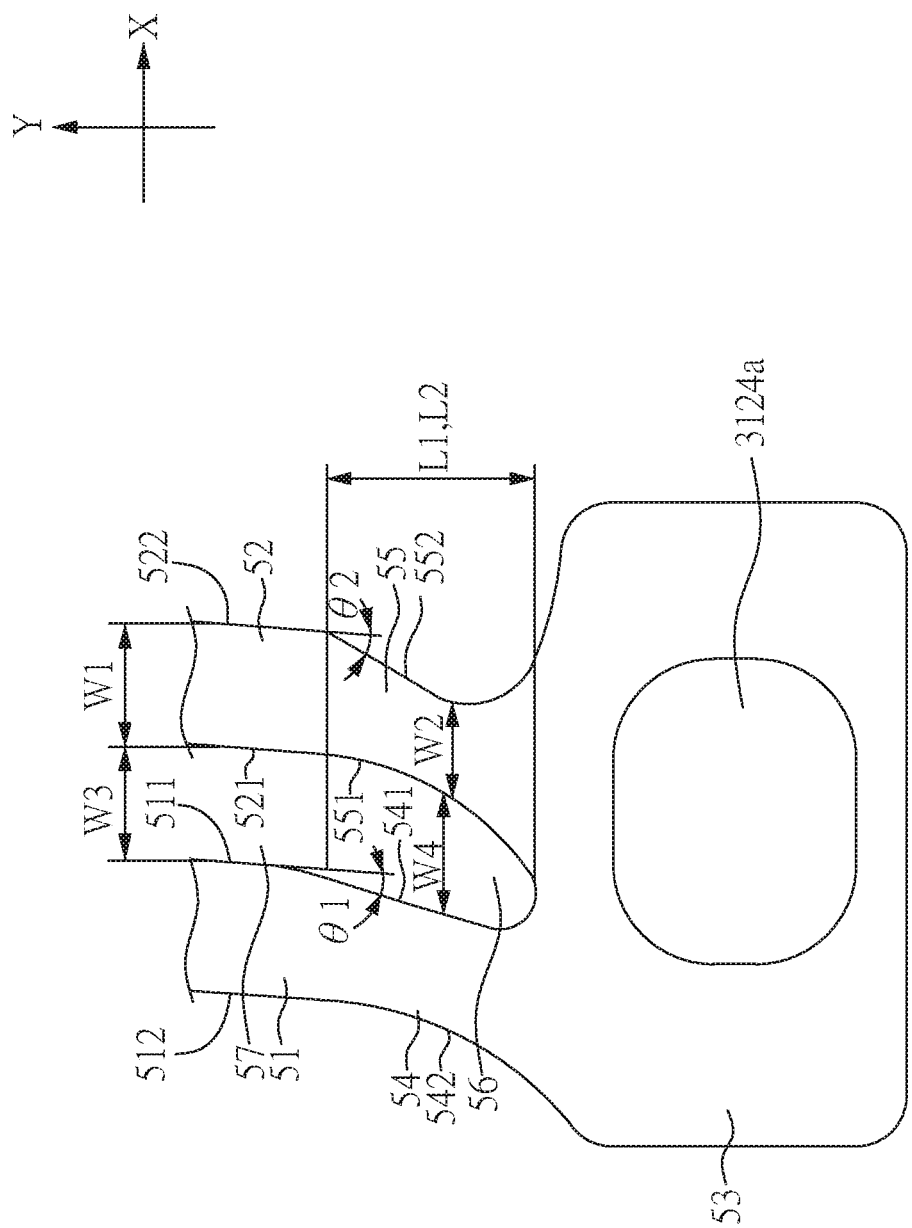
FIGS. 5 and 6 are respectively a schematic view of partial pixel electrode according to one embodiment.
Figure 6:
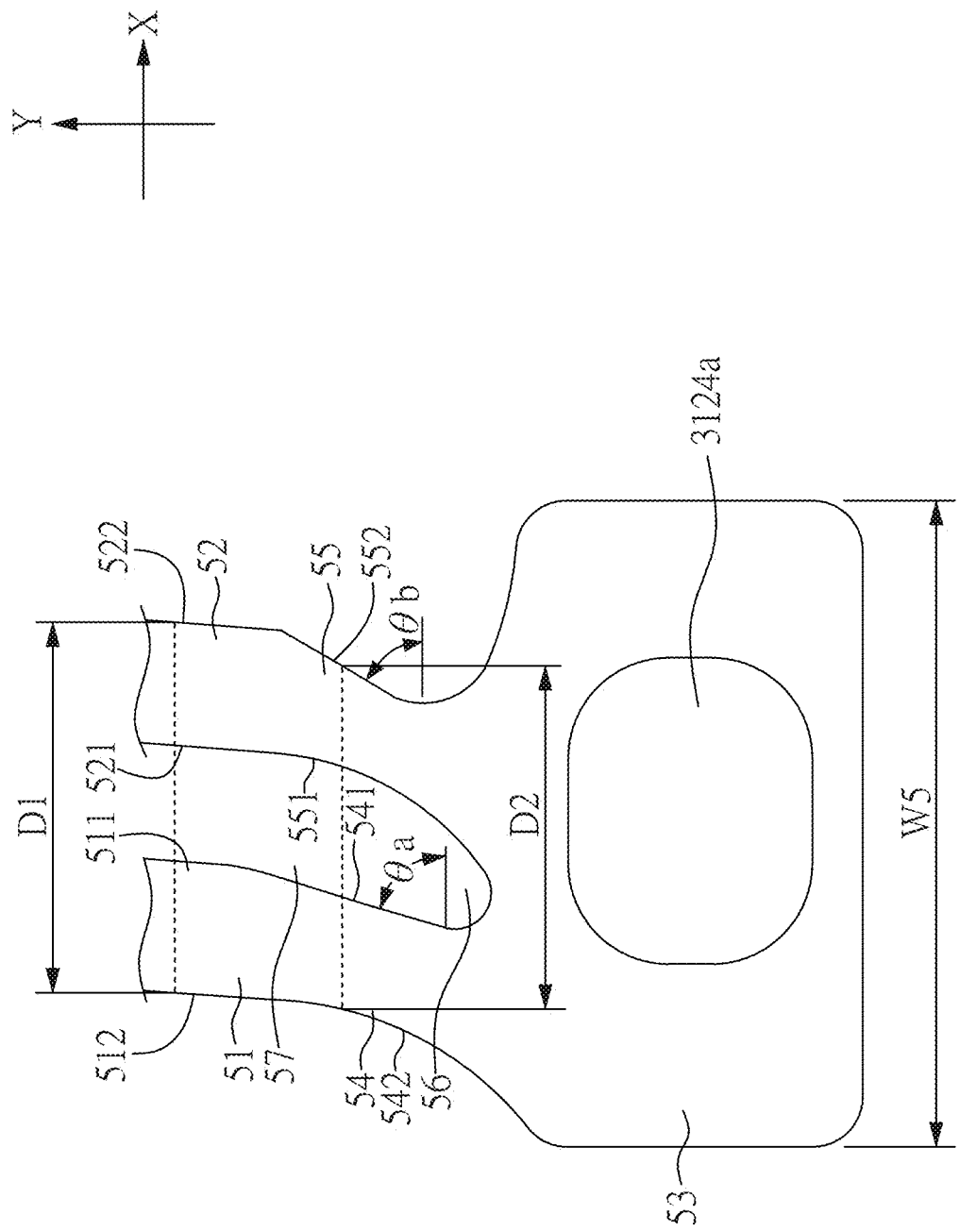

FIGS. 5 and 6 are respectively a schematic view of partial pixel electrode according to one embodiment. Herein, for clearly describing the features of the pixel electrode of the present embodiment, FIGS. 5 and 6 are the same views, and the difference therebetween is only the reference numbers. As shown in FIGS. 5 and 6, the pixel electrode of the present embodiment comprises: a first finger portion 51 with a first inner edge 511 and a third outer edge 512 opposite to the first inner edge 511; a second finger portion 52 with a second inner edge 521 and a first outer edge 522 opposite to the second inner edge 521, wherein the second inner edge 521 is between the first inner edge 511 and the first outer edge 522; a contacting portion 53 electrically connecting to the switch unit 3123 (as shown in FIG. 4) through a contact via 3124a, and a part of the contacting portion disposed in the contact via 3124a to electrically connect to the drain electrodes 3123d of the switch units 3123 (as shown in FIG. 4); a first bending portion 54 between the first finger portion 51 and the contacting portion 53, connecting the first finger portion 51 and the contacting portion 53, and having a third inner edge 541 and a fourth outer edge 542 opposite to the third inner edge 541; and a second bending portion 55 between the second finger portion 52 and the contacting portion 53, connecting the second finger portion 52 and the contacting portion 53, and having a fourth inner edge 551 and a second outer edge 552 opposite to the fourth inner edge 551, wherein the fourth inner edge 551 is between the third inner edge 541 and the second outer edge 552.

As shown in FIG. 5, in the pixel electrode of the display panel of the present embodiment, a first angle θ1 included between a first extension line of the first inner edge 511 and the third inner edge 541 is smaller than a second angle θ2 included between a second extension line of the first outer edge 522 and the second outer edge 552. In addition, as shown in FIG. 6, a first acute angle θa included between the third inner edge 541 and a reference line parallel to a first direction X is greater than a second acute angle θb included between the second outer edge 552 and the reference line, and the first direction X is substantially parallel to a gate-line-extending direct shown in FIG. 3). When the first angle θ1 is smaller than the second angle θ2 and/or the first acute angle θa is greater than the second acute angle θb, the second outer edge 552 cart be more close to the third inner edge 541, so that the dark lines existing when the display panel in the bright state can be more close to the region near to the contacting portion 53, resulting in the improvement on the liquid-crystal efficiency. In the present embodiment, a difference between the first angle θ1 and the second angle θ2 is in a range from 1 degree to 10 degree; and a difference between the first acute angle θa and the second acute angle θb is also in a range from 1 degree to 10 degree. Herein, the phrase "the first direction is substantially parallel to a gate-line-extending direction" refers to that an included angle between the first direction and the extension direction of the gate line is 0-5 degree, and most preferably is 0 degree. In addition, the term "first acute angle" and "second acute angle" refers to included angles ranging between 0 degree and 90 degree.

In addition, as shown in FIG. 5, in the pixel electrode of the display panel of the present embodiment, the second finger portion 52 has a first width W1 along the first direction X, the second bending portion 55 has a second width W2 along the first direction X, and the first width W1 is greater than the second width W2. Similarly, when the first width W1 is designed to be greater than the second width W2, the width of the second bending portion 55 near to the contacting portion 53 can be reduced, further reducing the width of the dark lines existing when the display panel is in a bright state.

Furthermore, as shown in FIG. 5, in the pixel electrode of the display panel of the present embodiment, a finger portion gap 57 is between the first inner edge 511 and the second inner edge 521, a bending portion gap 56 is between the third inner edge 541 and the fourth inner edge 551, and the bending portion gap 56 is between the finger portion gap 57 and the contacting portion 53 and connects the finger portion gap 57 and the contacting portion 53. Herein, the second bending portion 55 has a first length L1 along a second direction Y, the bending portion gap 56 has a second length L2 along the second direction Y, the second direction Y is substantially vertical to a gate-line-extending direction (as shown in FIG. 3), and the first length L1 is substantially equal to the second length L2. Herein, the phrase "the second direction is substantially vertical to a gate-line-extending direction" refers to that an included angle between the second direction and the extension direction of the gate line is 85-90 degree, and most preferably is 90 degree. In addition, the phrase "the first length is substantially equal to the second length" refers to that the deviation between the first length and the second length is 0-5%.

In addition, as shown in FIG. 5, in the pixel electrode of the display panel of the present embodiment, the finger portion gap 57 has a third width W3 along the first direction X, the bending portion gap 56 has a fourth width W4 along the first direction X, and the third width W3 is smaller than the fourth width W4. Similarly, when the third width W3 is designed to be smaller than the fourth width W4, the width of the second bending portion 55 near to the contacting portion 53 can be reduced to further reduce the width of the dark lines existing when the display panel is in a bright state.

As shown in FIG. 6, in the pixel electrode of the display panel of the present embodiment, there is a first distance D1 from the first outer edge 522 to the third outer edge 512 along the first direction X, the contacting portion 53 has a fifth width W5 along the first direction X, and the first distance D1 is smaller than the fifth width W5. In addition, there is a second distance D2 from the second outer edge 552 to the fourth outer edge 542 along the first direction X, and the second distance D2 is smaller than the fifth width W5. In order to achieve the purpose of high pixel density, the area of one single pixel region has to be decreased; however, the contact via 3124a therein cannot be reduced at the same time. Hence, in order to prevent the problem that the dark line near to the contacting portion 53 and the second bending portion 55 may exist due to the various tilt directions of the liquid crystal molecules, the first distance D1 and the second distance D2 are designed to be respectively smaller than the fifth width W5. Therefore, when the display panel is in a bright state, the dark line can be more close to the region near to the contacting portion 53, further improving the liquid-crystal efficiency in this region.

Furthermore, as shown in FIG. 6, in the pixel electrode of the display panel of the present embodiment, the first distance D1 is also designed to the greater than the second distance D2. Hence, the width of the second bending portion 55 near to the contacting portion 53 can be decreased, to further reduce the dark line existing when the display panel is in a bright state.

The display panel shown in FIG. 2 is examined to confirm the display panel provided by the aforementioned embodiment has better liquid-crystal efficiency. In addition, the liquid-crystal efficiency, when there are various differences between the first angle θ1 and the second angle θ2 of the pixel electrode shown in FIG. 5, is also measured. Herein, the term "the liquid-crystal efficiency" refers to the light intensity per unit area.

Figure 7:
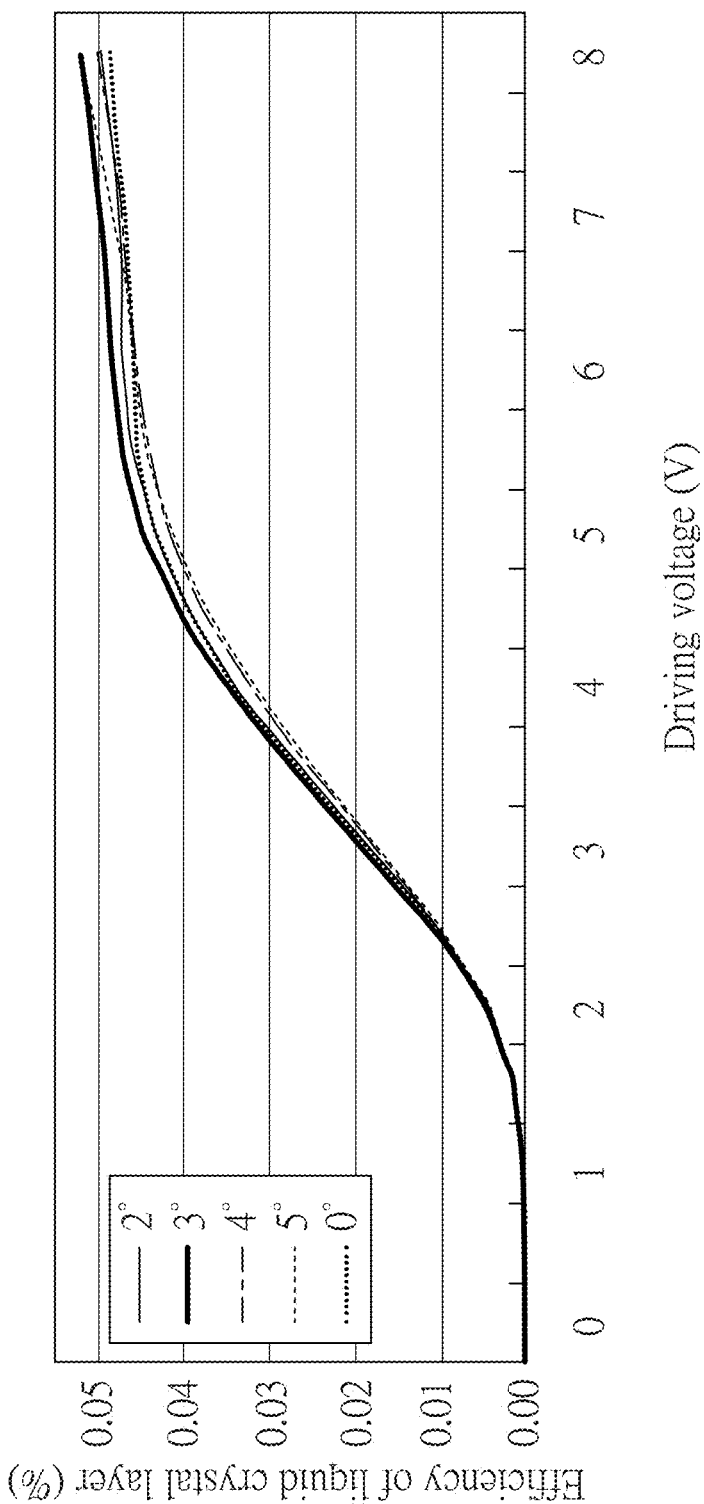
FIG. 7 is a diagram showing the relation between a driving voltage to a display panel and the efficiency of a liquid crystal layer according to one embodiment.

When a driving voltage ranging from 0V to 8V is applied to the display panel shown in FIG. 2, the liquid-crystal efficiency are measured in the case that the first angle θ1 and the second angle θ2 of the pixel electrode are the same (the difference between the first angle θ1 and the second angle θ2 of the pixel electrode is 0 degree) and the differences between the first angle θ1 and the second angle θ2 of the pixel electrode are 2, 3, 4 and 5 degree. The obtained liquid-crystal efficiency in the region shown in FIG. 5 is illustrated in FIG. 7. When the difference between the first angle θ1 and the second angle θ2 of the pixel electrode is 0 degree, the obtained liquid-crystal efficiency in the region shown in FIG. 5 is 0.048643%. When the difference between the first angle θ1 and the second angle θ2 of the pixel electrode is 5 degree, the obtained liquid-crystal efficiency in the region shown in FIG. 5 is 0.051924%. Comparing the case that the difference between the first angle θ1 and the second angle θ2 of the pixel electrode is 0 degree, the gain of the liquid-crystal efficiency when the difference between the first angle θ1 and the second angle θ2 of the pixel electrode is 5 degree is 6.75%. This result indicates that the liquid-crystal efficiency in the region shown in FIG. 5 can be improved when the width of the second bending portion 55 is reduced to make the first angle θ1 smaller than the second angle θ2, that is, the second outer edge 552 is getting more close to the first bending portion 54.

Herein, the pattern of the dark line corresponding to the pixel electrode shown in FIG. 5 when the display panel is in a bright state is simulated. The result is shown in FIG. 8, in which the display panel shown in FIG. 2 is used for the simulation, wherein the first angle θ1 and the second angle θ2 of the pixel electrode are the same (the difference between the first angle θ1 and the second angle θ2 of the pixel electrode is 0 degree), and the first angle θ1 is smaller than the second angle θ2 of the pixel electrode and the difference between the first angle θ1 and the second angle θ2 is 5 degree.

Figure 8:
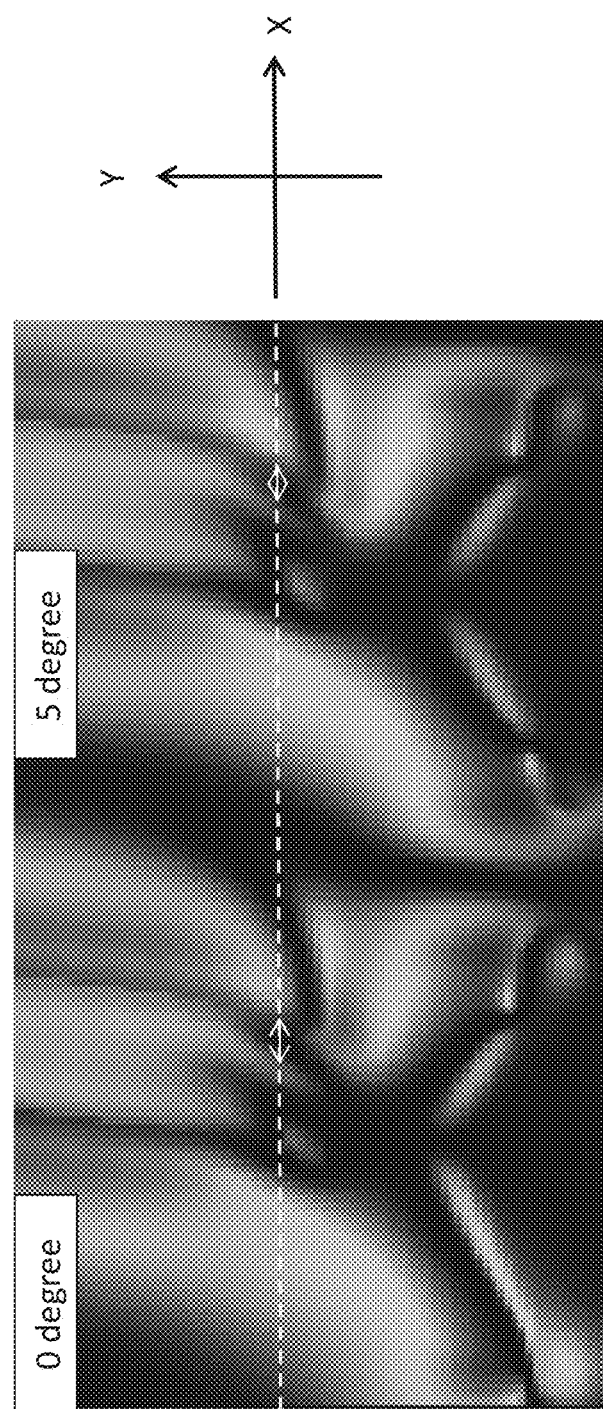
FIG. 8 is a simulation result showing a bright state of a display panel according to one embodiment.

As shown in FIG. 8, comparing the case that the first angle θ1 is identical to the second angle θ2 of the pixel electrode, on the basis of the same reference line (indicated by the dot line) which is substantially parallel to the first direction X being a gate-line-extending direction (as shown in FIG. 3), the width of the dark line can be significantly reduced (indicated by the arrows) when the difference between the first angle θ1 and the second angle θ2 thereof is 5 degree. Thus, the stability of the liquid crystal molecules in this region can be improved.

In conclusion, in the aforementioned embodiment, the second outer edge of the second bending portion can be more close to the fourth inner edge thereof and the third inner edge of the first bending portion when the first angle is designed to be smaller than the second angle. Therefore, when the display panel is in a bright state, the width of the dark line corresponding to the pixel electrode can be reduced, and also the dark line can be getting more close to the region near to the contacting portion, resulting in the liquid-crystal efficiency improved.

In the aforementioned embodiment, the term "width", "distance" and "length" respectively refers to "minimum width", "minimum distance" and "minimum length" between two edges, and the "angle" refers to "maximum angle" included between two edges, extension lines thereof and/or reference lines.

In the aforementioned embodiment, the pixel electrode comprising two finger portions and bending portions are described. However, in other embodiment of the present invention, the pixel electrode may comprise three or more finger portions and bending portions, as long as the finger portions and bending portions most far from the TFT unit (which is the right finger portions and bending portions in the view of FIG. 3) has the aforementioned features.

In addition, in the aforementioned embodiment, a homogeneous aligned display panel is described. However, in other embodiment of the present invention, vertical aligned display panel may also have the aforementioned features of the present invention.

Furthermore, the display panel provided by the aforementioned embodiment may be used with any touch panel known in the art, to form a touch display device. Meanwhile, the display panel provided by the aforementioned embodiment and the touch display device can be applied to any electronic device for displaying images, such as a mobile phone, a notebook, a camera, a video camera, a music player, a navigation system, or a television.

Although the invention has been explained in relation to its embodiment, it is to be understood that many other possible modifications and variations can be made without departing from the spirit and scope of the invention as hereinafter claimed.

What is claimed is:

1. A display device, comprising:
   a first substrate, comprising:
     a switch unit; and
     a pixel electrode electrically connecting to the switch unit and comprising:
       a first finger portion with a first inner edge;
       a second finger portion with a second inner edge and a first outer edge, wherein the second inner edge is between the first inner edge and the first outer edge;
       a contacting portion electrically connecting to the switch unit through a contact via;
       a first bending portion between the first finger portion and the contacting portion, connecting the first finger portion and the contacting portion, and having a third inner edge; and
       a second bending portion between the second finger portion and the contacting portion, connecting the second finger portion and the contacting portion, and having a fourth inner edge and a second outer edge, wherein the fourth inner edge is between the third inner edge and the second outer edge,
     wherein the first finger portion has a first width along a first direction, the first bending portion has a second width along the first direction, the first direction is substantially parallel to a gate-line-extending direction, and the first width is greater than the second width;
   a second substrate; and
   a display medium between the first substrate and the second substrate.

2. The display device as claimed in claim 1, wherein a finger portion gap is between the first inner edge and the second inner edge, a bending portion gap is between the third inner edge and the fourth inner edge, the finger portion gap has a third width along the first direction, the bending portion gap has a fourth width along the first direction, and the third width is smaller than the fourth width.

3. The display device as claimed in claim 1, wherein the first finger portion has a third outer edge opposite to the first inner edge, there is a first distance from the first outer edge to the third outer edge along the first direction, the contacting portion has a fifth width that is a maximum width along the first direction, and the first distance is smaller than the fifth width.

4. The display device as claimed in claim 1, wherein the first bending portion has a fourth outer edge opposite to the third inner edge, there is a second distance from the second outer edge to the fourth outer edge along the first direction, the contacting portion has a fifth width that is a maximum width along the first direction, and the second distance is smaller than the fifth width.

5. The display device as claimed in claim 1, wherein the first finger portion has a third outer edge opposite to the first inner edge, the first bending portion has a fourth outer edge opposite to the third inner edge, there is a first distance from the first outer edge to the third outer edge along the first direction, there is a second distance from the second outer edge to the fourth outer edge along the first direction, and the first distance is greater than the second distance.

6. The display device as claimed in claim 1, wherein a first angle included between a first extension line of the first inner edge and the third inner edge is smaller than a second angle included between a second extension line of the first outer edge and the second outer edge.

7. The display device as claimed in claim 1, wherein the second finger portion has a sixth width along the first direction, the second bending portion has a seventh width along the first direction, and the sixth width is greater than the seventh width.

* * * * *